US007384003B1

(12) United States Patent
Boyer et al.

(10) Patent No.: US 7,384,003 B1
(45) Date of Patent: Jun. 10, 2008

(54) APPARATUS AND METHODS FOR PREVENTING ENGAGEMENT OF STACKED EMBOSSED CARDS

(75) Inventors: David C. Boyer, Madison, WI (US); Glenn J. Gauger, Cottage Grove, WI (US)

(73) Assignee: MCD, Inc., Madison, WI (US)

( * ) Notice: Subject to any disclaimer, the term of this patent is extended or adjusted under 35 U.S.C. 154(b) by 415 days.

(21) Appl. No.: 11/157,596

(22) Filed: Jun. 21, 2005

Related U.S. Application Data

(60) Provisional application No. 60/581,534, filed on Jun. 21, 2004.

(51) Int. Cl.
*G06K 19/06* (2006.01)

(52) U.S. Cl. ...................... 235/494; 235/380; 235/488; 235/489; 235/492; 235/493

(58) Field of Classification Search ................. 235/494
See application file for complete search history.

(56) References Cited

U.S. PATENT DOCUMENTS 2,833,386 A 5/1958 Hueber
3,253,691 A 5/1966 Gollwitzer
3,461,581 A * 8/1969 Hoffmann ................... 283/107
3,638,563 A 2/1972 Drillick
3,648,816 A 3/1972 Marinoff
3,726,380 A 4/1973 Beers et al.
3,757,684 A 9/1973 Drillick
RE27,809 E 11/1973 Drillick
3,773,162 A 11/1973 Lentz et al.
3,820,455 A 6/1974 Hencley et al.
3,861,299 A 1/1975 Drillick
4,088,216 A 5/1978 LaManna et al.
4,151,987 A 5/1979 Toriumi et al.
4,180,338 A 12/1979 LaManna et al.
4,238,125 A 12/1980 Klietz
4,244,582 A * 1/1981 Raees et al. ................ 273/293
4,255,073 A 3/1981 Schottle
4,271,012 A 6/1981 LaManna et al.
4,384,711 A 5/1983 Gabel et al.
4,459,910 A 7/1984 Taube
4,461,587 A 7/1984 Schottle
4,519,600 A 5/1985 Warwick et al.
4,541,340 A * 9/1985 Peart et al. ................. 101/470
4,686,898 A 8/1987 LaManna et al.
4,747,706 A 5/1988 Duea
4,755,069 A 7/1988 LaManna et al.
4,783,064 A 11/1988 Hayashi
4,784,059 A 11/1988 LaManna et al.
4,789,079 A 12/1988 Kobayashi et al.
4,969,760 A 11/1990 LaManna et al.
4,999,075 A * 3/1991 Coburn, Jr. ................. 156/209
5,070,781 A 12/1991 Lundstrom et al.
5,503,514 A 4/1996 LaManna et al.
5,837,991 A 11/1998 LaManna et al.

(Continued)

*Primary Examiner*—Uyen-Chau N Le
(74) *Attorney, Agent, or Firm*—Godfrey & Khan S.C.

(57) ABSTRACT

An apparatus and methods for preventing engagement of stacked embossed cards is disclosed. The methods include the steps of embossing a sheet of cards in at least two unique embossment patterns, separating the cards from the sheet, and collating the cards using at least one conveyor such that no two adjacent cards have substantially the same embossment pattern. The apparatus includes an embossing press, a first conveyor, a stripping station, and a second conveyor.

14 Claims, 7 Drawing Sheets

U.S. PATENT DOCUMENTS

| | | | | |
|---|---|---|---|---|
| 5,949,680 | A * | 9/1999 | Kettelkamp | 700/100 |
| 5,974,961 | A | 11/1999 | Kazo et al. | |
| 6,152,029 | A * | 11/2000 | Templeton | 101/35 |
| 6,231,042 | B1 | 5/2001 | Ito et al. | |
| 6,352,206 | B1 | 3/2002 | Ashley et al. | |
| 6,494,365 | B1 | 12/2002 | Kozakai et al. | |
| 6,592,035 | B2 * | 7/2003 | Mandile | 235/454 |
| 6,602,043 | B2 | 8/2003 | Honda | |
| 7,029,547 | B2 * | 4/2006 | Biller | 156/219 |
| 7,309,007 | B2 * | 12/2007 | Kean | 235/380 |
| 2001/0042953 | A1 | 11/2001 | Honda | |
| 2002/0180139 | A1 | 12/2002 | Honda | |
| 2002/0180140 | A1 | 12/2002 | Honda | |
| 2003/0085273 | A1 | 5/2003 | Kozakai | |
| 2003/0201317 | A1 | 10/2003 | Shay | |
| 2004/0144472 | A1 * | 7/2004 | Cowie | 156/64 |

* cited by examiner

APPARATUS AND METHODS FOR PREVENTING ENGAGEMENT OF STACKED EMBOSSED CARDS

CROSS-REFERENCE TO RELATED APPLICATION

This application is based on and claims the benefit of U.S. Provisional Patent Application No. 60/581,534, filed on Jun. 21, 2004, and incorporated herein by reference.

BACKGROUND OF THE INVENTION

This invention relates generally to the field of manufacturing embossed cards, and more specifically to preventing a bottleneck in the manufacturing process that occurs when the embossed portions of stacked cards engage one another and cannot be quickly and easily separated. The present invention includes an apparatus and method for preventing the engagement of stacked embossed cards.

In the embossed plastic card industry, numerous standards have evolved over the years to ensure that the shape, size, thickness, and material of such cards are consistent. An example of these cards is a standard credit card. The term "credit card," as used herein, refers to any embossed plastic card, whether or not used for purchasing via credit, and generally having the characteristics of common, wallet-sized cards such as MasterCard® or Visa® cards. Because credit cards are so common, the universal shape, feel, and look of a credit card are instantly recognizable to most consumers. Given the widespread use of credit cards and the need for replacing them as they are lost, damaged, or expire, a sizeable market exists for mass-producing embossed credit cards.

Authentic credit cards usually contain unique embossed information, for example, a specific name, card number, and expiration date. For this reason, authentic credit cards commonly are produced individually in what is known by those skilled in the art as a "one-up" process, which allows for customization of the information embossed on each card. In the one-up process, a tool and die, arranged in the shape of a unique design (e.g., a name, credit card number, and expiration date), are used to perform the embossing, and the design on the tool and die is changed incrementally to allow embossing of cards that contain varying information. Because the tools and dies required for embossing must be variable in order to produce varying embossments, methods used to produce these are known as "dynamic embossing" methods.

The instantly recognizable look and feel of credit cards has led to a successful type of direct-mail advertising involving what are known as promotional or "dummy" credit cards. Promotional credit cards are not authentic credit cards, but generally look and feel like them. It is estimated that the success of direct-mail advertisements containing dummy credit cards results from consumers' interest in learning what information may be contained on the enclosed credit card, which they recognize by touch even before opening the advertisement. Promotional cards may or may not contain unique embossed designs on them. Because promotional credit cards need not necessarily contain unique information, they do not necessarily require dynamic embossing methods that allow for changes in the embossing pattern. Embossing methods that do not require such changes are known as "static embossing" methods and generally employ fixed rather than variable tools and dies.

Providers of both authentic and promotional credit cards frequently need cards produced in large quantities, sometimes tens of millions at a time. Generally, during manufacture, the embossed credit cards are stacked on top of one another, for example, in stacks of 500 or more embossed cards. These stacks frequently are bound together and sent to a downstream process in credit card manufacturing. For example, a stack of embossed cards may be transported to a manufacturing station where the cards will undergo additional processes such as ink jetting, in which a unique identifier number may be applied to each card, or affixing the embossed card to letterhead stationery in preparing a direct mailing. In many of these downstream processes, it is important that the individual embossed cards be quickly and easily removed from the stack.

There is a known bottleneck in credit card manufacturing that results from the tendency of stacked, embossed credit cards to physically engage one another at their embossed portions. This engagement occurs where an embossed portion of one credit card interlocks or "nests" with the embossed portion of an adjacent card in the stack. This may occur wherever an embossed portion of one card is similar in size and/or shape and location on the card to the embossed portion of the adjacent card immediately above or below it in the stack. The result of this engagement is that any individual card in the stack may not be easily or quickly removed from the stack. Downstream credit card manufacturing processes, particularly if automated, often require the embossed cards to be freely and quickly slid from the top or bottom of the stack. The engagement of adjacent embossed cards within a stack impedes downstream manufacturing processes and presents a significant problem in credit card production.

In the prior art, methods and mechanisms for producing cards having embossments in multiple patterns are known. In U.S. Pat. Nos. 4,900,168 and 6,142,370 to LaManna, for example, a card transporting system and mechanism is disclosed wherein single cards are embossed in multiple, selected card patterns using a "one-up" dynamic embossing process. To emboss the cards in selected patterns, the card transporting system and mechanism positions the cards to be embossed at selected locations. As well, U.S. Patent Publication No. 2005/0028922 to Biller discloses a card embossing system for embossing a sheet of cards wherein the embossing on adjacent columns of cards is offset, and the cards are then cut and collated using an alternating receiving tray system. The alternating receiving tray system has a plurality of cells to receive individual cards, and must be moved to a new location after every sheet of cards is cut to ensure that adjacent cards stacked in the receiving tray will have offset embossing. The use of the receiving tray system to collate the cards is awkward and can be difficult to implement in a high volume manufacturing process because each card must fall into a particular cell on the tray, and the tray must be moved to alternating locations in order to stack the cards such that adjacent cards will have offset embossing.

Prior art methods and mechanisms do not adequately solve the nesting bottleneck problem because although the cards can be embossed in different patterns, most of the prior art is limited to a "one-up" dynamic embossing process and cannot adequately accommodate mass production of multiple cards simultaneously. More importantly, the prior art methods and mechanisms do not provide an adequate collating system to stack the cards such that no two adjacent cards have all embossments in substantially the same embossment pattern.

Given the limitations and problems with existing card embossing apparatuses and methods, there exists a need for an improved card embossing apparatus and method that can emboss a sheet of cards in a number of different embossment patterns, and easily and efficiently collate the cards such that adjacent cards in a collated stack do not have embossments in the same pattern. The present invention relates to improvements over the apparatuses and methods described above, and to solutions to the problems raised or not solved thereby.

SUMMARY OF THE INVENTION

The present invention provides an apparatus and methods for preventing the engagement of stacked embossed cards with one another, so that an embossed card in a stack may be freely and slidably removed from the stack substantially without frictional resistance caused by interlocking or nesting areas of embossment on adjacent cards in the stack.

The apparatus of the present invention includes an embossing press for embossing a sheet of cards embossed in at least a first embossment pattern and a second embossment pattern, a first conveyor for receiving and transporting the sheet of cards, a stripping station located at the end of the first conveyor for separating the cards from the sheet, and a second conveyor for collecting the separated cards in a shingled configuration such that no two adjacent cards have substantially the same embossment pattern. The second conveyor preferably travels at a slower speed than the first conveyor to produce the shingled configuration.

One method of the present invention includes the step of embossing cards on a sheet of material in at least a first embossment pattern and a second embossment pattern, the second embossment pattern differing from the first embossment pattern such that cards embossed with the first embossment pattern will not nest with cards embossed with the second embossment pattern. The method further includes the steps of separating the embossed cards from the sheet of material, and collating the cards using a collating conveyor to produce a stack of cards such that no two adjacent cards in the stack have the same embossment pattern. A second method of the present invention includes the steps of embossing cards on a sheet in a plurality of unique embossment patterns, separating the cards from the sheet, and arranging the separated cards in a shingled configuration on a conveyor such that no two adjacent cards have substantially the same embossment pattern.

The present invention has several advantages over the prior art apparatuses and methods. Most significantly, the apparatus and methods of the present invention allow a sheet of cards that has been embossed in at least two embossment patterns to be more easily and efficiently collated to produce a stack of cards in which no two adjacent cards have substantially the same embossment pattern. Such a stack of cards will not nest and thus will eliminate the bottleneck present in the downstream production processes. Other objects, features and advantages of the present invention will become apparent after reviewing the following detailed description and claims.

DETAILED DESCRIPTION OF THE INVENTION

Figure 1:
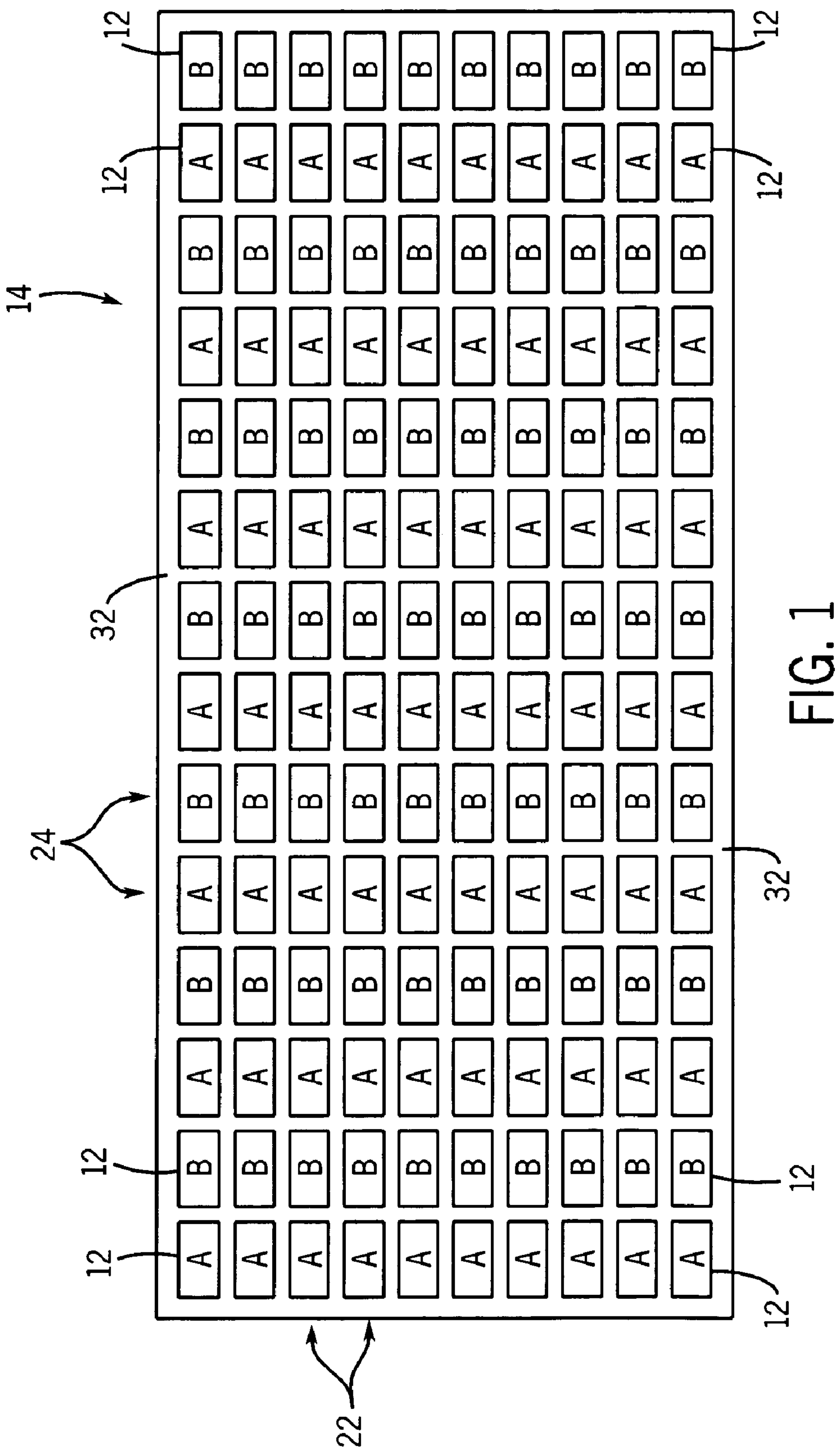
FIG. 1 is a diagram illustrating one embodiment of a sheet of cards embossed in multiple embossment patterns, shown as Patterns A and B, according to the present invention.

Referring now to the drawings, FIG. 1 shows an entire sheet 14 of cards 12 having columns 24 of cards embossed in alternating embossment patterns, Pattern A and Pattern B. An entire sheet 14 of plastic or other suitable material is preferably embossed at one time using a static embossing process, though the present invention could also be used in connection with other dynamic identification processes, such as ink jetting. Each card 12 in the sheet 14 is embossed with either a Pattern A embossment or Pattern B embossment. In FIG. 1, each row 22 of cards 12 in the sheet 14 is embossed in alternating embossment Patterns A and B, and each column 24 of cards 12 is embossed in a single embossment Pattern A or B. Alternatively, each column 24 in the sheet could be embossed in alternating embossment Patterns A and B, and each row 22 could be embossed in a single embossment Pattern A or B, or both the rows 22 and columns 24 in the sheet 14 could be embossed in alternating embossment Patterns A or B. The cards on the sheet are typically die cut to the shape of a credit card, though other methods of cutting the shape of the cards could also be used. The cards could also be cut into other shapes.

The number of different embossment patterns can be as few as two, as shown as Pattern A and Pattern B in FIG. 1, and as many as the number of cards in the sheet, i.e., each card in the sheet could have a unique embossment. Two embossment patterns are typically preferred because it allows for the most tooling flexibility. Using a unique embossment pattern for each column in a sheet, such as using unique embossments in Patterns A-J for a ten-column sheet, can also be beneficial. In that case, if one card, such as a card embossed in Pattern B, gets lost in the production process, the Pattern A and Pattern C cards will still not nest if stacked adjacent to one another. On the other hand, using only two embossment patterns, a missing Pattern B card would result in two Pattern A cards being stacked together and allowed to nest. As previously mentioned, however, the present invention allows as few as two unique embossment patterns, as many as the number of cards on the sheet, and any number in between.

Figure 2A:
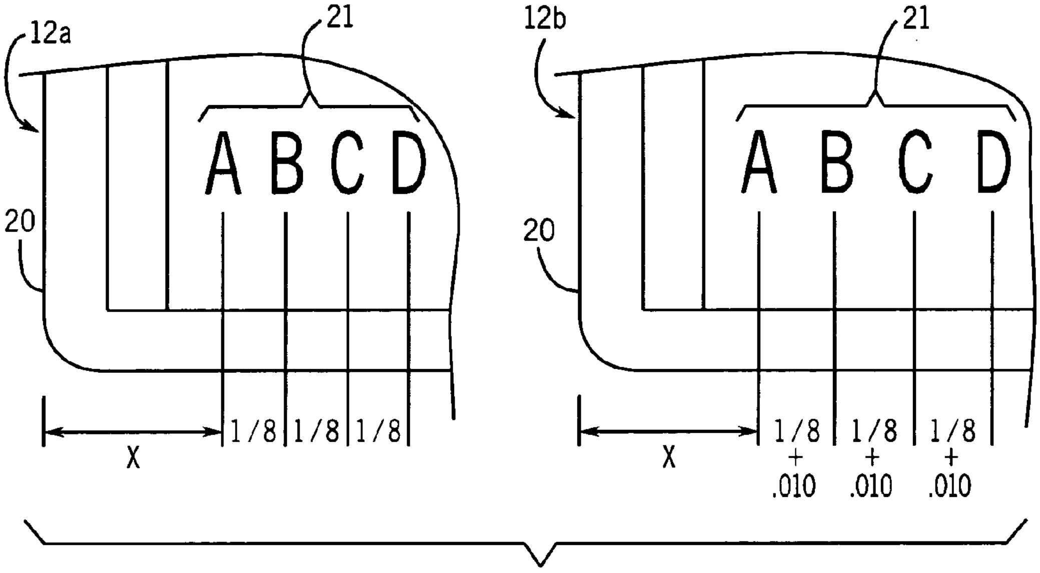
FIG. 2*a* is a partial view of the lower left corner of two embossed cards illustrating one method for producing multiple embossment patterns on a sheet of cards, wherein the space between the embossed letters is varied by 0.010 inches.
Figure 2B:
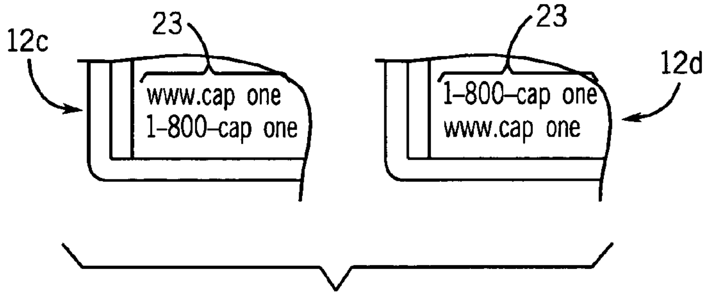
FIG. 2*b* is a partial view of the lower left corner of two embossed cards illustrating a second method for producing multiple embossment patterns on a sheet of cards, wherein embossed lines of text are alternated.
Figure 2C:
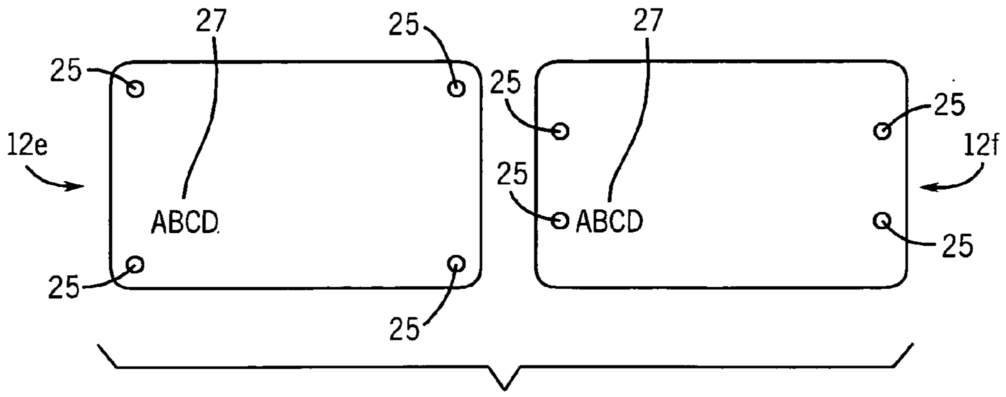
FIG. 2*c* is a partial view of the lower left corner of two embossed cards illustrating a third method for producing multiple embossment patterns on a sheet of cards, wherein the location of embossed circles or periods is varied.
Figure 2D:
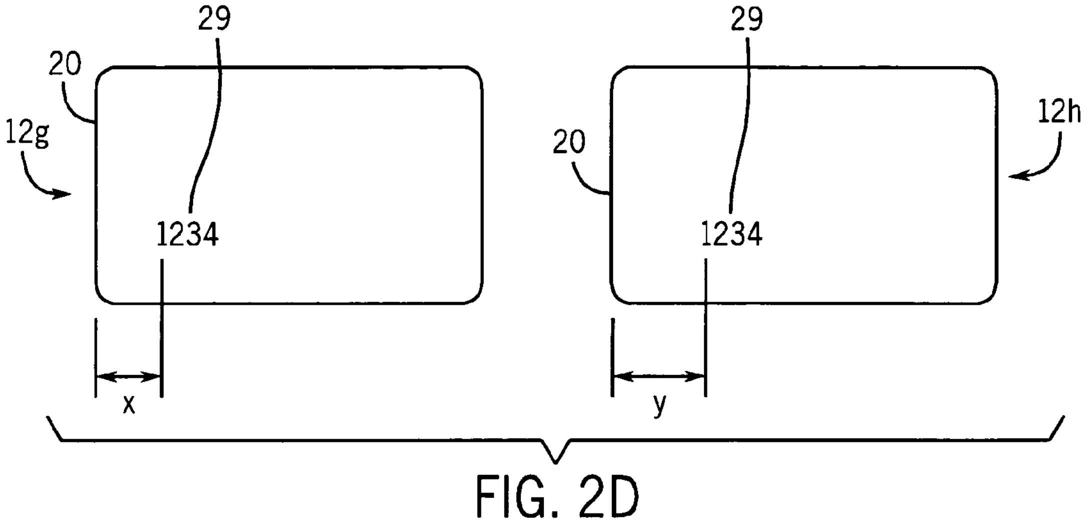
FIG. 2*d* is a top plan view of two embossed cards illustrating a fourth method for producing multiple embossment patterns on a sheet of cards according to the present invention, wherein the first embossment pattern begins at "x" distance from the edge of the card and the second embossment pattern begins at "y" distance from the edge of the card.
Figure 3:
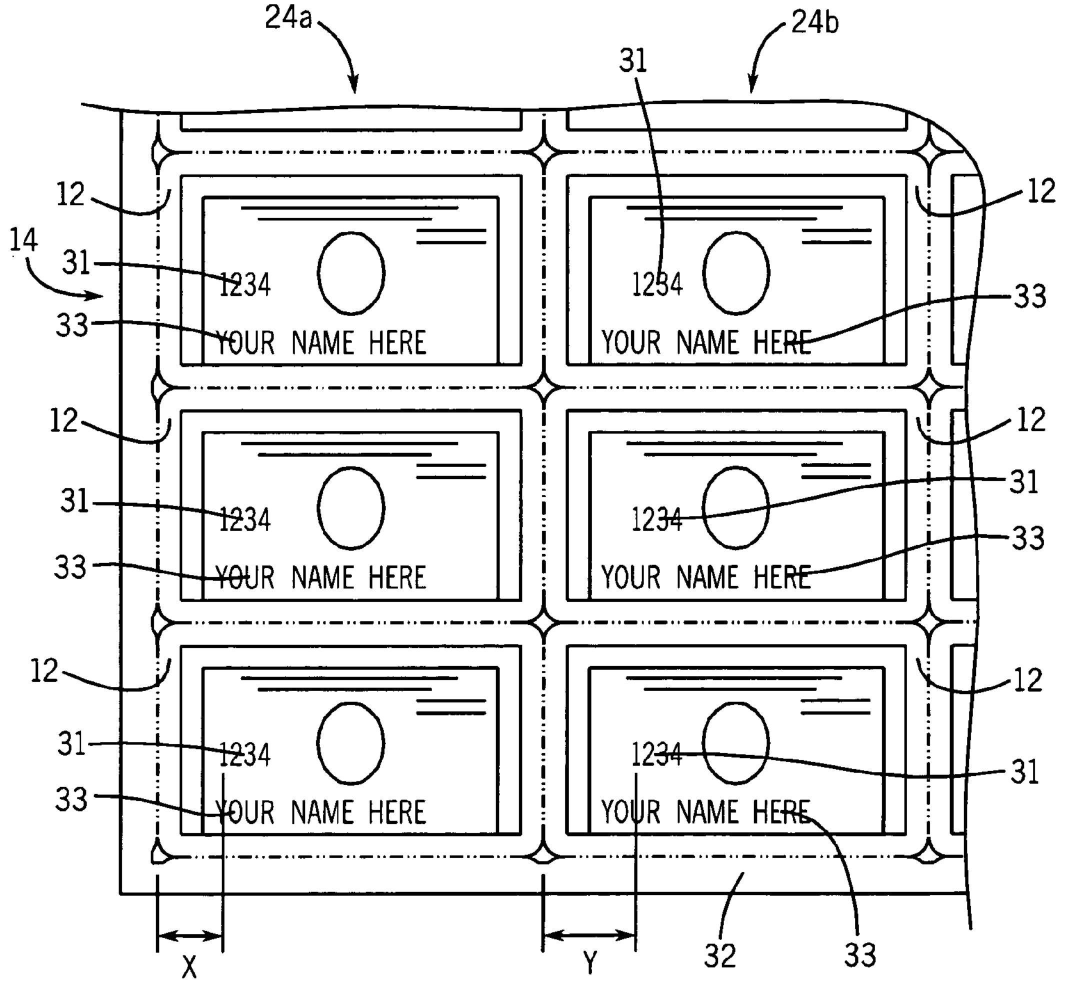
FIG. 3 is a partial view of a sheet of embossed cards illustrating the use of multiple embossment patterns in adjacent columns of the sheet.

There are a number of ways to produce cards with unique embossments. FIGS. 2*a*-2*d* illustrate a number of those methods. FIG. 2*a* shows two cards 12*a*, 12*b* with unique embossments. Both embossments start at the same distance "x" from the left edge 20 of the card 12 and contain the same letters 21, but the letters 21 embossed on the first card 12*a* are spaced apart by ⅛$^{th}$ inch, and the letters 21 on the second card 12*b* are spaced apart by ⅛$^{th}$ inch plus an additional 0.010 inches. Thus, the cards 12*a*, 12*b* look generally the same, but have been differentiated enough to prevent nesting. Other variations similar to that shown in FIG. 2*a* could also be used, such as varying the spacing only between embossed words, or maintaining the same spacing but varying the font used for the letters or modifying individual letters slightly (such as varying the location of the center dash in a letter "A"). FIG. 2*b* shows another method for producing different embossments. In FIG. 2*b*, the lines 23 of text embossed on the first card 12*c* have been alternated on the second card 12*d*. Thus, the cards 12*c*, 12*d* have the same information, but the information is listed in a different order. FIG. 2*c* shows a method that involves adding a set of four circles or periods 25 to the embossment on each card 12*e*, 12*f*, but varying the position of the circles or periods 25 to prevent nesting. Using this method, the embossed text 27 of the cards 12*e*, 12*f* can stay identical, as the varying locations of the circles or periods will alone prevent nesting. FIG. 2*d* shows yet another method for varying the embossments, wherein the embossment 29 on the first card 12*g* begins at a distance "x" from the left edge 20 of the first card 12*g* and the embossment 29 of the second card 12*h* begins at a distance "y" from the left edge 20 of the second card 12*h*. Any of these methods, and any other methods that produce unique or varying embossments can be used to produce a sheet of cards having at least two different embossment patterns. FIG. 3, for example, shows a sheet 14 of cards 12 embossed in two different embossment patterns produced according to the method shown in FIG. 2*d*, wherein a first embossment pattern is used in the first column 24*a* and a second embossment pattern is used in the second column 24*b*. In FIG. 3, only the first line of text 31 is varied between the first embossment pattern and the second embossment pattern; the second line of text 33 remains the same. This is also an effective method for preventing nesting.

Figure 4:
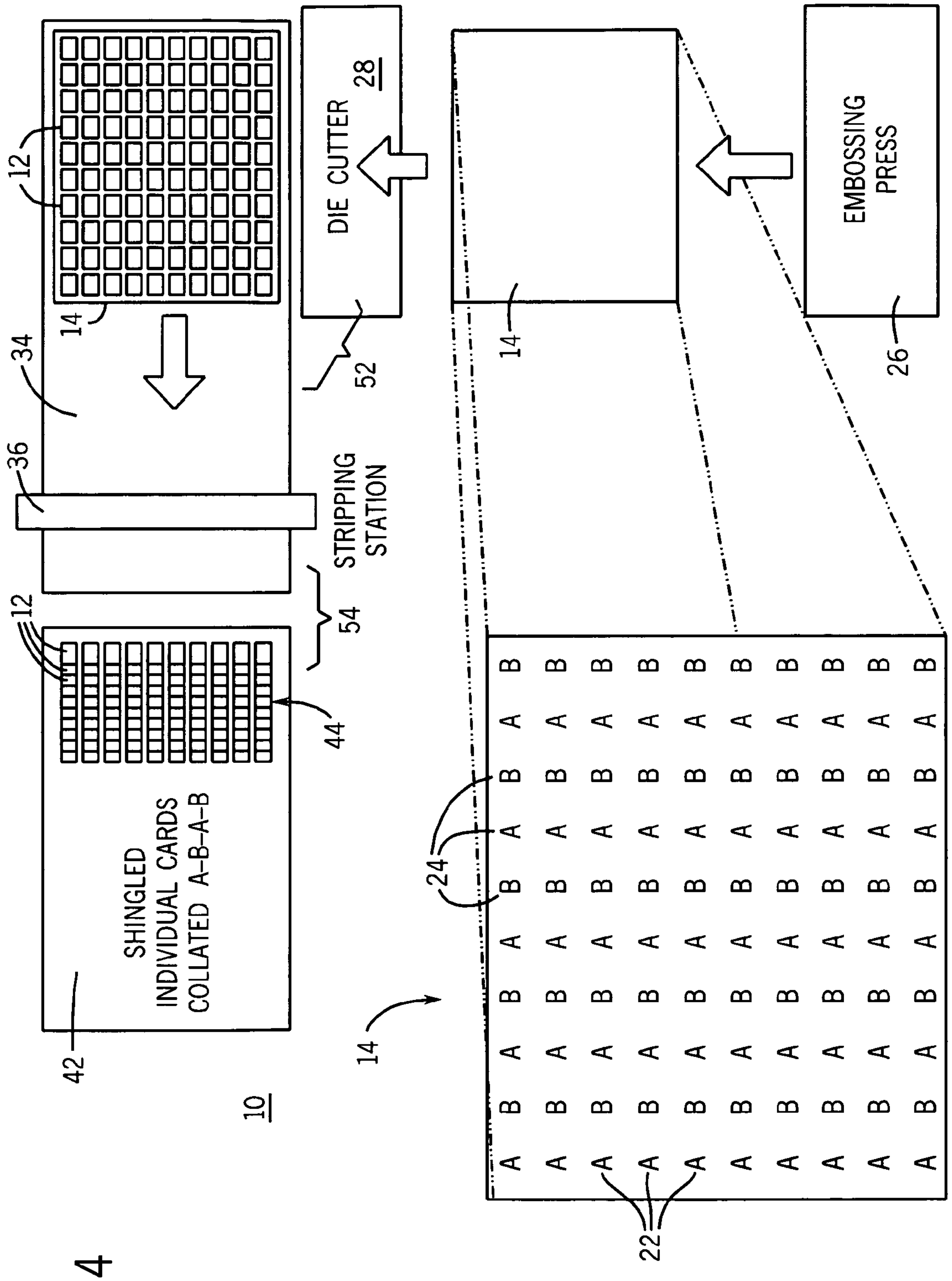
FIG. 4 is a diagram illustrating one embodiment of the embossing, separating and collating processes of the present invention.
Figure 5:
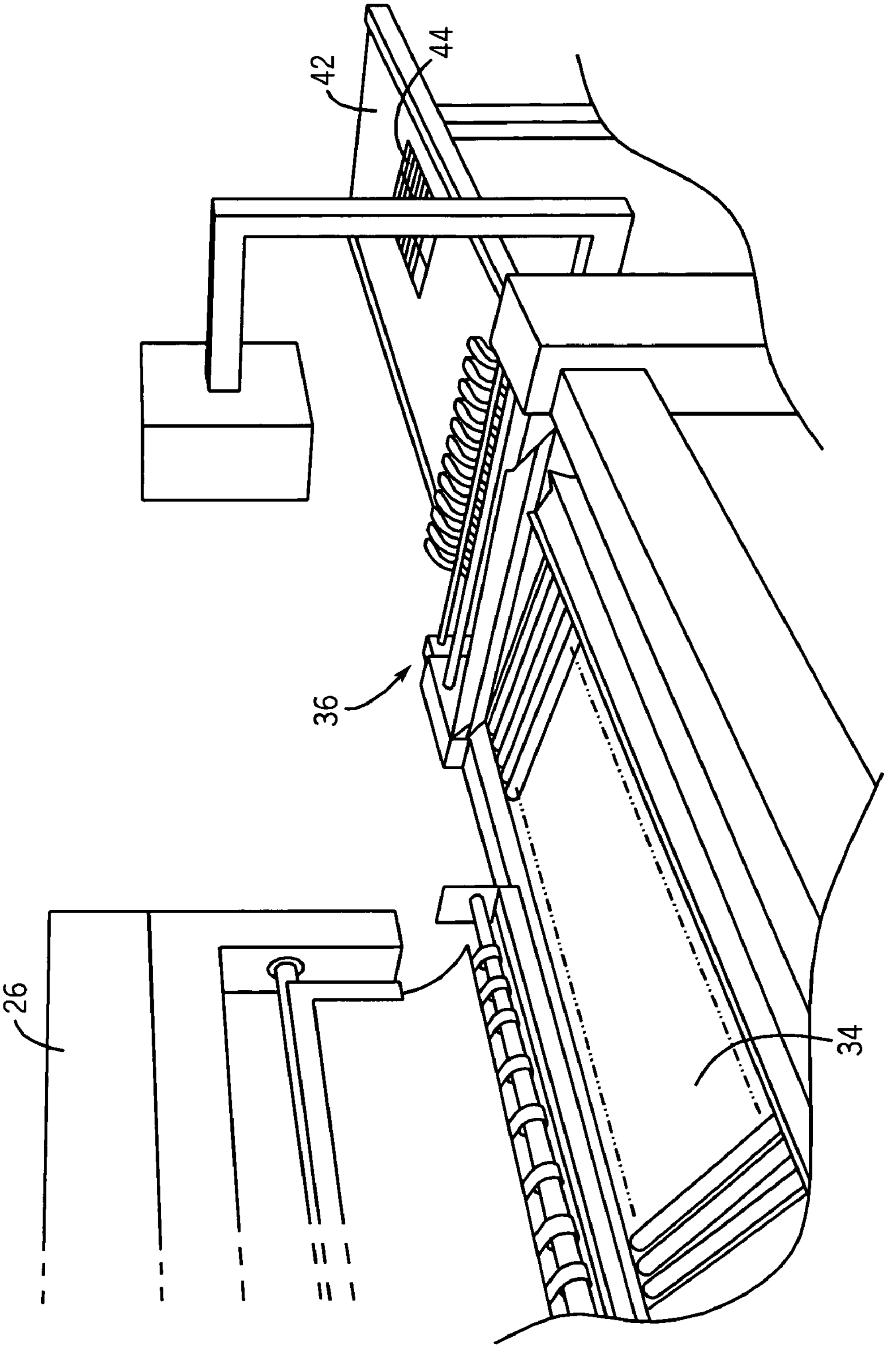
FIG. 5 is a perspective view of one embodiment of the separating and collating apparatus of the present invention.

FIGS. 4 and 5 show one preferred embodiment of the embossing, separating and collating processes of the present invention. In FIG. 4, an embossed sheet 14, having rows 22 embossed in alternating embossment Patterns A and B and columns 24 embossed in a single embossment Pattern A or B, exits the embossing press 26, traveling in a direction parallel to the columns 24 in the sheet 14, and enters the die cutter 28. The die cutter 28 cuts the embossed sheet 14 into the shape of credit cards or other desired shape, but does not completely cut the cards 12 away from the plastic sheet 14. Instead, the die cutter 28 leaves small pieces of plastic, or "nicks," (not shown) that keep the cards 12 fixed to the sheet 14. The portion of the die cut sheet 14 that is not part of the cards 12 is known as the matrix 32 (shown best in FIGS. 1 and 3).

Figure 6:
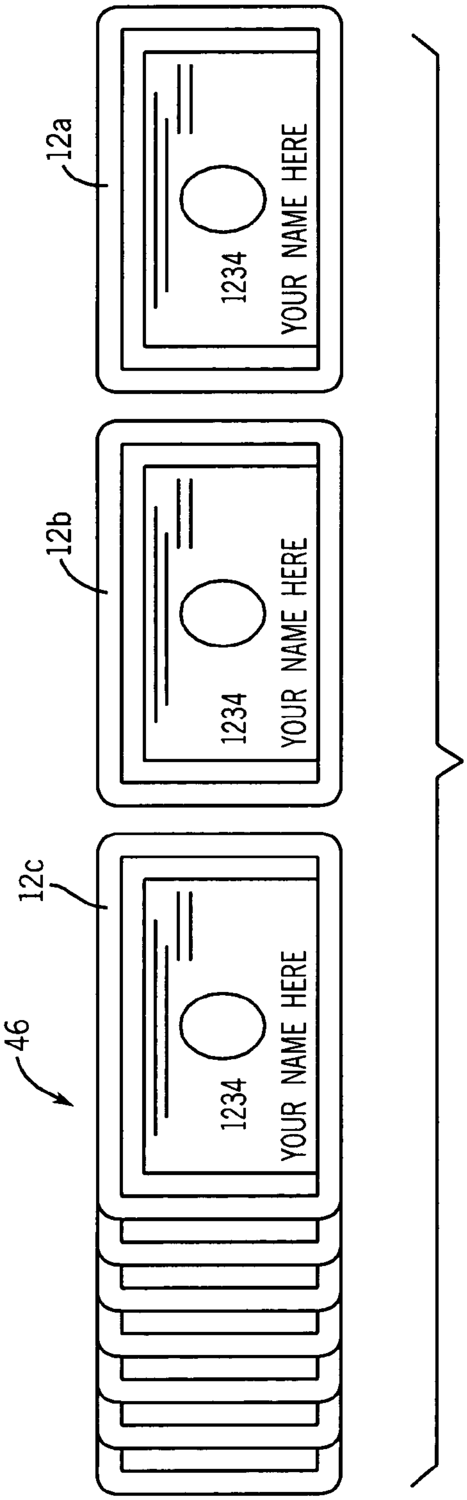
FIG. 6 is a top plan view of a stack of embossed cards collated according to the present invention, showing each adjacent card having embossments in alternating patterns.

Referring again to FIGS. 4 and 5, once the embossed, die cut sheet 14 leaves the die cutter 28, the sheet 14 is then placed on or is otherwise transferred to a first conveyor 34 that moves the sheet to a stripping station 36. The first conveyor 34 moves in a direction perpendicular to the columns 24 on the sheet 14 and parallel to the rows 22 on the sheet 14, such that a column 24 with cards 12 in a single Pattern A or B enters the stripping station 36 first, as shown. Although the type of conveyor 34 used is not particular to the present invention, if using a roller conveyor as shown in FIG. 5, it is best to place the sheet 14 on the conveyor 34 such that the length of the cards 12 is perpendicular to the rollers 40 on the conveyor 34. The stripping station 36 separates the cards 12 from the matrix 32, directing the matrix 32 to a location below the conveyor 34 or stripping station 36 for later disposal or recycling and directing the cards 12 to a second conveyor 42. The second conveyor 42 is positioned at a lower level and moves at a slower speed than the first conveyor 34, causing the cards 12 to be placed in a shingled configuration 44 on the second conveyor 42 with each card 12 overlapping the adjacent card or cards 12. The orientation of the sheet 14 on the first conveyor 34 causes each row 22 of shingled cards 12 to be collated with alternating Pattern A and B embossments, such that no two adjacent cards 12 will have embossments in precisely the same pattern. The shingled cards 12 can then be stacked and packaged for use in downstream processes. The stacks of cards collated with alternating embossments will not nest or otherwise engage, thereby eliminating the bottleneck associated with the stacked cards in the downstream processes. An example of a stack 46 of cards embossed and collated according to the present invention is shown in FIG. 6. FIG. 6 shows a shingled stack 46 of cards, wherein the first two cards 12*a*, 12*b* have been removed from the stack for illustration. Cards 12*a* and 12*c* in FIG. 6 have the same embossment pattern, whereas card 12*b* has a different embossment pattern to prevent nesting with cards 12*a* and 12*c*.

As previously noted, the sheet 14 could also be embossed with columns 24 of cards 12 having alternating embossment Patterns A and B and rows 22 of cards 12 having a single embossment Pattern A or B. If embossed in this fashion, the sheet 14 would need to enter the stripping station 36 traveling in a direction parallel to the columns 24 on the sheet 14 and perpendicular to the rows 22 on the sheet 14, such that a row 22 of cards 12 having a single embossment pattern A or B would enter the stripping station 36 first.

Alternatively, the sheet 14 could also be embossed with both rows 22 and columns 24 having alternating embossment Patterns A and B. If the sheet 14 is embossed in this fashion, the sheet 14 could enter the stripping station 36 in a direction either parallel or perpendicular to the rows 22 or columns 24 of the sheet 14. As well, the sheet 14 could be embossed with any number of different embossment patterns, as described above, with the positions of the different embossment patterns determining the direction in which the sheet 14 should enter the stripping station 36 as described herein.

While the process of the present invention includes steps for embossing, separating the embossed cards, and collating them, the invention is not limited to these steps. Typically, in credit card manufacturing, the process of the present invention would be incorporated into a series of other steps. For example, a manufacturing process that employs the present invention may include a first embossing step that embosses a sheet at Patterns A and B; a second foilstamping step, which applies metallic foil to the embossed regions on the sheets; a third card separating step, which separates individual embossed cards 12 from the sheet 14; a fourth collating step, which arranges the cards 12 in alternating order according to their embossment Patterns A and B and allows the cards 12 to be assembled in a stack 46 in accordance with the present invention; a fifth ink jetting step, in which a unique identifier (not shown) is applied to each card 12; and a sixth affixation step, in which each card 12 is mounted onto letterhead stationery (not shown). Such a process, among others, could employ the present invention to avoid the problems caused by stacked embossed cards 12 physically engaging one another at their areas of embossment. As well, the separating and collating processes of the present invention could be used in-line or off-line with the embossing step and/or the die cutting step.

Figure 7:
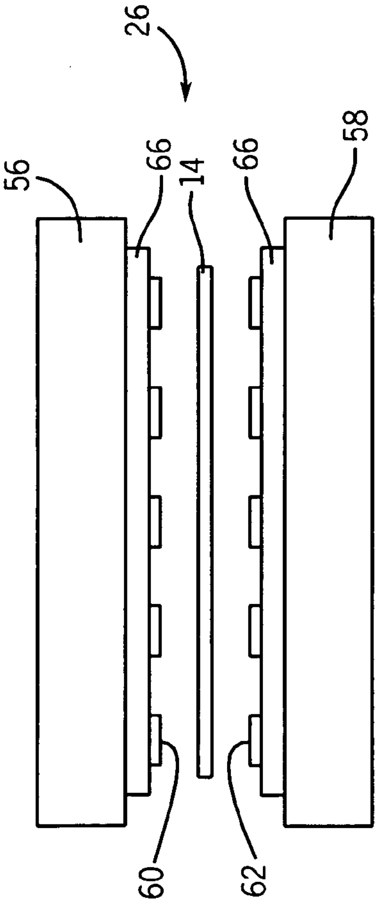
FIG. 7 is an embossing press having die/counter pairs according to the present invention.
Figure 8:
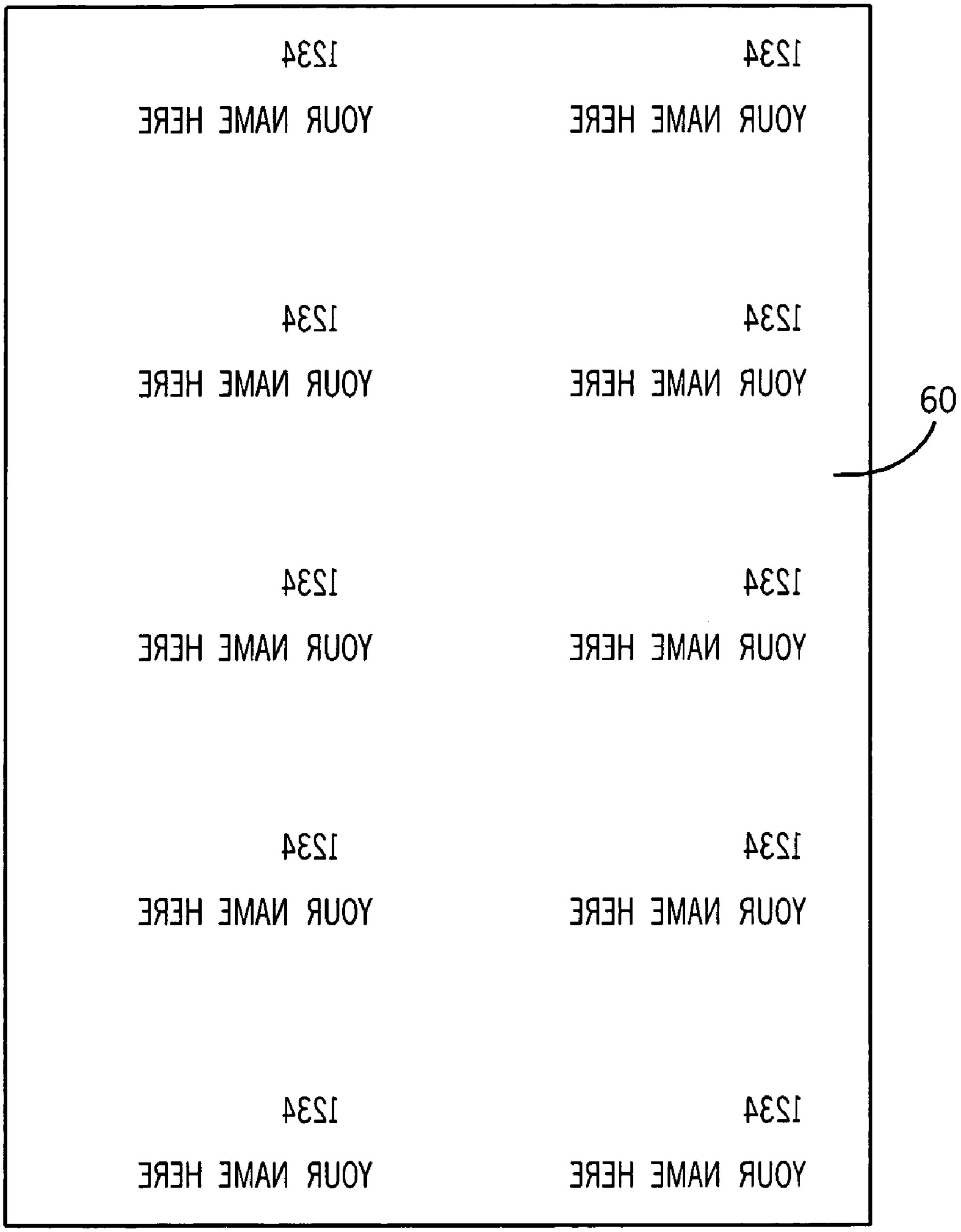
FIG. 8 is a top plan view of an embossing die having alternating embossment patterns according to one embodiment of the present invention.

As shown schematically in FIG. 4, an apparatus 10 for preventing engagement of stacked cards 12 in accordance with the present invention has an embossing press 26, a card separator 52, and a card collator 54. As shown in FIG. 7, the embossing press 26 preferably has at least two large parallel platens 56, 58 and is capable of applying pressure between said platens. A plurality of female dies 60 having a relief design and male counters 62 having a complementary relief design can be affixed between the platens 56, 58 of the press 26 for simultaneously embossing a predetermined pattern on a sheet 14 of plastic or other suitable material. The predetermined pattern includes at least a first embossment Pattern A and a second embossment Pattern B different from the first embossment Pattern. An example of a die 60 having a relief design including both the first and second embossment Patterns A and B is shown in FIG. 8. Although the relief design of die 60 shown in FIG. 8 includes both the first and second embossment Patterns A and B, a single die/counter 60, 62 pair could have relief designs in only one of the first or second embossment Patterns A or B, wherein the predetermined design would result from the arrangement of a plurality of die/counter 60, 62 pairs having either embossment Pattern A or B. In one embodiment of the press 26 depicted in FIG. 7, each die 60 and counter 62 is affixed to a steel “honeycomb” 66 that in turn is fastened to a platen 56, 58 by any suitable means known in the art, including industry-standard toggles (not shown) which clamp a die 60 or counter 62 down to the honeycomb 66 and use high heat adhesive tape (not shown). A suitable press 26 to be equipped as described herein is a Bobst Model 102 BMA foilstamping/embossing press.

The card separator 52 of the apparatus separates individual cards 12 from the sheet 14 of plastic or other suitable material after the sheet has been embossed by the press 26. In one embodiment, shown in FIGS. 4 and 5, the card separator 52 comprises a die-cutter 28 which, as described above, cuts incomplete perimeter shapes of credit cards 12 from the sheet 14, leaving a small, uncut “nick” in the perimeter where the cards 12 remain attached to the sheet 14. In this embodiment, the card separator 52 further comprises a stripping station 36 which breaks the nicks, completely separating the embossed cards 12 from the matrix 32. A suitable card separator 52 to be employed as described herein may be achieved using a Bobst Model 102E die cutter for die-cutting incomplete perimeter shapes in conjunction with a Brausse BSP-40 Blanking Unit for stripping the cards 12 from the sheet 14.

The collator 54 arranges the individual embossed cards 12 in an alternating order, so that no two adjacent cards 12 bear embossed portions in the same pattern. In one preferred embodiment, a suitable collator 54 is the Brausse BSP-40 Blanking Unit, which may be used to laterally move the embossed cards 12 from a first conveyor 34 to another, slower moving and lower positioned second conveyor 42, the result being that the cards 12 overlap or are “shingled” on the second conveyor 42 as depicted in FIGS. 4 and 5. The collated cards 12 then can be stacked, manually or otherwise, according to the present invention.

Although the preferred embodiments described above refer to specific machine types to facilitate the embossing, separating and collating of the cards, the present invention is not limited to the specific machines mentioned. For example, any type of embossing process that produces cards embossed in at least a first embossment Pattern A and a second embossment Pattern B could be used. In addition, any method of separating the cards from the matrix could be used that allows the cards to be collated with alternating embossment patterns. Separating the cards, further, may or may not include the process of cutting the shape of the cards in the sheet. For example, methods other than die cutting could be used, or the cards could already have the desired shape when they reach the embossing process. It is also possible that separating the cards from the sheet may not be necessary, for instance, the cards could be individually embossed in alternating embossment patterns, wherein the cards could be in their final shape at the time of the embossing process. Various collating processes could also be used, including collating by hand.

While an apparatus in accordance with the present invention has a press 26, a card separator 52, and a card collator 54, it also may include a number of other elements designed to achieve different functions. For example, an apparatus according to the present invention also may include, without limitation, a means for foilstamping embossed sheets 14, a means for ink jetting predetermined designs onto each embossed card 12, and a means for affixing the cards 12 onto letterhead stationery (not shown) intended for direct mailing.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention.

What is claimed is:

1. A method for preventing engagement of stacked embossed cards, the method comprising:

embossing card information on a sheet of material in at least a first embossment pattern and a second embossment pattern, the second embossment pattern differing from the first embossment pattern;

die-cutting the sheet of material into desired card shapes such that the sheet of material contains a matrix portion and a plurality of card portions, the card portions remaining attached to the matrix portion;

transferring the embossed die-cut sheet of material to a first conveyor;

moving the embossed die-cut sheet of material along the first conveyor to a stripping station;

stripping the card portions from the matrix portions of the sheet of material such that the card portions are separated from the matrix portion and become individual embossed cards;

transferring the individual embossed cards to a second conveyor, the second conveyor moving at a slower speed than the first conveyor; and stacking the cards on the second conveyor to produce stacks of cards such that no two adjacent cards in a stack have the same embossment pattern.

2. The method of claim 1, wherein stacking the cards includes producing a shingled pattern of cards on the second conveyor.

3. The method of claim 1, wherein the first embossment pattern and second embossment pattern are embossed in alternating columns of the sheet.

4. The method of claim 3, wherein the sheet of material moves along the first conveyor in a direction perpendicular to the columns of the sheet.

5. The method of claim 1, wherein the first embossment pattern and second embossment pattern are embossed in alternating rows of the sheet.

6. The method of claim 5, wherein the sheet of material moves along the first conveyor in a direction perpendicular to the rows of the sheet.

7. The method of claim 1, wherein the first embossment pattern and second embossment pattern are embossed in alternating rows and alternating columns of the sheet.

8. The method of claim 1, wherein the card information of the first embossment pattern includes characters spaced apart by a first distance, and the card information of the second embossment pattern includes characters spaced apart by a second distance, the second distance greater than the first distance.

9. The method of claim 1, wherein the card information of the first embossment pattern and the second embossment pattern includes a first line of characters and a second line of characters, and wherein the first line of characters is positioned above the second line of characters in the first embossment pattern and the first line of characters is positioned below the second line of characters in the second embossment pattern.

10. The method of claim 1, wherein the second embossment pattern includes at least one character not included in the first embossment pattern.

11. The method of claim 1, wherein the first embossment pattern is positioned a first distance away from a first edge of the cards and the second embossment pattern is positioned a second distance away from the first edge of the cards, the second distance greater than the first distance.

12. A method for producing a stack of embossed cards, the method comprising:

embossing card information on a sheet in a plurality of unique embossment patterns;

die-cutting the sheet of material into desired card shapes such that the sheet of material contains a matrix portion and a plurality of card portions, the card portions remaining attached to the matrix portion;

transferring the sheet to a first conveyor;

separating the card portions from the matrix portion of the sheet;

transferring the separated cards to a second conveyor; and arranging the separated cards in a shingled configuration on the second conveyor such that no two adjacent cards have substantially the same embossment pattern.

13. An apparatus for preventing engagement of stacked embossed cards, the apparatus comprising:

an embossing press for embossing a sheet of material in at least a first embossment pattern and a second embossment pattern;

a die-cutter for die-cutting the sheet of material into desired card shapes such that the sheet of material contains a matrix portion and a plurality of card portions, the card portions remaining attached to the matrix portion;

a stripping station for separating the card portions from the matrix portion of the sheet;

a first conveyor positioned between the die-cutter and the stripping station for receiving the embossed sheet of material from the die cutter and transporting the embossed sheet of material to the stripping station; and a second conveyor positioned adjacent the stripping station for collecting the separated cards in a shingled configuration such that no two adjacent cards have substantially the same embossment pattern.

14. The apparatus of claim 13, wherein the second conveyor travels at a slower speed than the first conveyor.

* * * * *